No. 836,147. PATENTED NOV. 20, 1906.
H. SCUDDER & R. K. HOHMANN.
LENS CLAMP.
APPLICATION FILED NOV. 7, 1905.
Fig. 1.
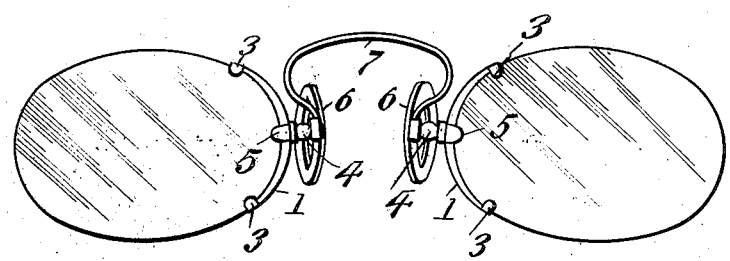
Fig. 2.
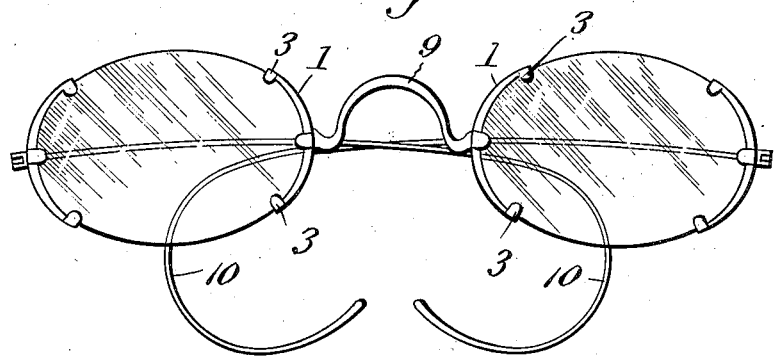
Fig. 3.　　　Fig. 4.　　　Fig. 5.
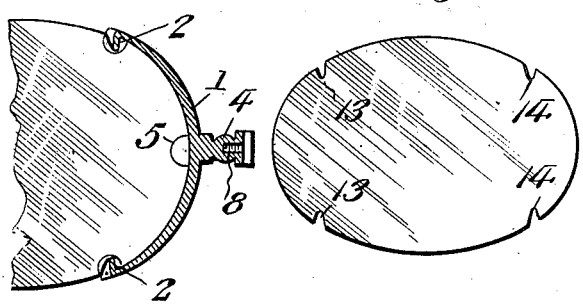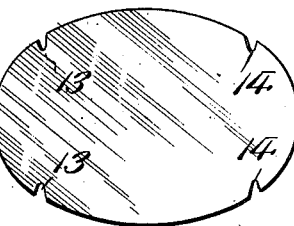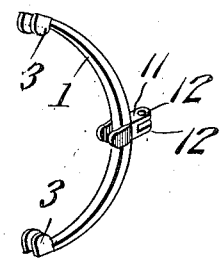
Witnesses
Geo Ackman Jr.
K. Allen.
Inventors
H. Scudder,
R. K. Hohmann,
By Victor J. Evans
Attorney

UNITED STATES PATENT OFFICE.

HEWLETT SCUDDER AND RICHARD KARL HOHMANN, OF SAN DIEGO, CALIFORNIA.

LENS-CLAMP.

No. 836,147.      Specification of Letters Patent.      Patented Nov. 20, 1906.

Application filed November 7, 1905. Serial No. 286,315.

*To all whom it may concern:*

Be it known that we, HEWLETT SCUDDER and RICHARD KARL HOHMANN, citizens of the United States, residing at San Diego, in the county of San Diego and State of California, have invented new and useful Improvements in Lens-Clamps, of which the following is a specification.

The invention relates to an improvement in eyeglasses, and particularly to a lens-clamp for securing the lenses of the eyeglass to the frame.

The main object of the present invention is the production of a clamp arranged for removable connection with the lens and adapted when in place thereon to snugly fit the edge of the lens throughout the length of the clamp, whereby the clamp may be made of comparatively light material without sacrificing any of its advantages.

In the preferred details of construction forming the subject-matter of the following specification it is to be noted that the invention is applicable to both eyeglass and spectacle lens, being in the latter case also adapted for supporting the temple-bows.

In the drawings, Figure 1 is a view in elevation showing our invention as applied to eyeglasses. Fig. 2 is a similar view illustrating the invention in connection with spectacles. Fig. 3 is a broken elevation of one of the lenses, the clamp being shown in section. Fig. 4 is an elevation of one of the lenses detached. Fig. 5 is a perspective of the clamp, illustrating particularly the form designed for receiving the temple-bows.

Referring to the drawings, our improved clamp comprises a comparatively thin strip of spring metal 1, conforming practically to the contour of the end of the lens and preferably of greatest thickness at its central point. The terminals of the strip are inwardly bent to provide lugs 2, and adjacent the lugs the strip is formed with laterally and oppositely projecting ears 3, which in the normal condition of the strip project at right angles from the plane of projection of the lugs.

The lens-post 4 is formed integral with the clamp-strip projecting radially from the central or thickest portion thereof, and in alinement with said post the strip 1 is formed with laterally-projecting ears 5, similar in size and shape to the ears 3, previously described.

In the use of the clamp with the lens of the usual rimless eyeglasses the nose pieces or clamps 6 and bridge 7 are secured to the post 4 by the usual securing-screws 8.

In adapting the clamp for use with spectacle-lenses the bridge-piece 9 thereof is formed integral with or fixedly secured to the central portion of the adjacent clamp-strip 1, the post 4 in this instance being dispensed with. By this construction the maximum solidity of parts and rigidity at this point is obtained.

The clamp-strips 1, designed for supporting the usual temple-bows 10, are formed centrally of their length and at their thickest portions with a projection 11, bifurcated at its free end to provide ears 12, between which the temple-bows are pivotally secured, as is usual in spectacle construction.

In preparing the lens for the reception of and cooperation with the clamp-strips the edge thereof is notched at 13 at equidistant points each side of the longitudinal central line of the lens, with which notches the lugs 2 of the clamp-plates are designed to engage. In the spectacle-lens additional notches 14 are similarly formed at the opposite end of the lens for cooperation with the clamp-plates supporting the temple-bow.

In practice the clamp-plates are secured to the respective lens by causing the lugs 2 of said plates to engage with the notches 13 or 14 of the lens, the construction and arrangement of the clamp-strip being such that the said engagement is a spring one and that the clamp-plate when in place on the lens bears squarely and snugly throughout its length on the edge of the lens. The ears 3 and 5 are bent downward into contact with the respective surfaces of the lens and serve to prevent independent lateral movement of the lens or clamp.

It is obvious that the clamp-strip may be engaged with the lens by bending one of the ears 3 and 5 of each pair outward and inserting the lugs 2 in the openings or notches 13 in the lens, after which the ears may be bent down into clamping position.

It will be noted that the clamp-strip of our invention bears throughout its length upon the edge of the lens and is formed at its ends and at its central portion with lips to bear directly upon the surfaces of the lens. By this arrangement of parts we are enabled to construct the clamp-plate of extremely light material, the advantage of which will be apparent. With the clamp-plate in place, its spring bearing upon the edge of the lens throughout the length of the plate and also the side bearing-lugs will effectually prevent any independent movement of the clamp.

The clamp-plate may be readily disconnected from the lens when desired in a manner fully apparent from the above description.

Having thus described the invention, what we claim is—

The combination with an eyeglass-lens formed with edge notches, of a clamp-strip comprising a length of spring material having end lugs to engage the notches, means projecting from opposite sides of the strips adjacent the lugs and bearing on the surfaces of the lens, a lens-post projecting from the strip, and means projecting from opposite sides of the strip in alinement with the post, said means being adapted to embrace the lens at the bearing-point of the post, the strip being adapted to bear throughout its entire length on the edge of the lens, whereby the ears are effective in preventing independent movement of said strip.

HEWLETT SCUDDER.
RICHARD KARL HOHMANN.

Witnesses:
 NATHAN VAN DENBURGH, Jr.,
 LOUISE MORELL.